United States Patent
Yang et al.

(10) Patent No.: US 10,345,118 B2
(45) Date of Patent: Jul. 9, 2019

(54) METHODS AND APPARATUS FOR HIGH SPEED LOCATION DETERMINATIONS

(71) Applicant: Intel Corporation, Santa Clara, CA (US)

(72) Inventors: Xue Yang, Arcadia, CA (US); Zhen Yao, San Jose, CA (US); Haibin Liu, Santa Clara, CA (US); Stephanie Moyerman, Phoenix, AZ (US); Braxton Lathrop, Lake Oswego, OR (US); James Hall, Hillsboro, OR (US); Jeremy Parra, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/264,361

(22) Filed: Sep. 13, 2016

(65) Prior Publication Data
US 2018/0073897 A1   Mar. 15, 2018

(51) Int. Cl.
| | |
|---|---|
| *A63F 9/00* | (2006.01) |
| *G01D 5/20* | (2006.01) |
| *A63B 63/00* | (2006.01) |
| *A63B 71/06* | (2006.01) |

(52) U.S. Cl.
CPC ......... *G01D 5/2006* (2013.01); *A63B 63/004* (2013.01); *A63B 71/0605* (2013.01)

(58) Field of Classification Search
None
See application file for complete search history.

(56) References Cited

U.S. PATENT DOCUMENTS

| | | | | |
|---|---|---|---|---|
| 4,375,289 | A * | 3/1983 | Schmall | A63B 63/004 |
| | | | | 273/127 R |
| 5,303,915 | A | 4/1994 | Candy | |
| 5,820,496 | A * | 10/1998 | Bergeron | A63B 63/00 |
| | | | | 273/371 |
| 7,795,861 | B2 * | 9/2010 | Englert | A63B 24/0021 |
| | | | | 324/207.16 |
| 7,867,113 | B2 * | 1/2011 | Petersen | A63B 24/0021 |
| | | | | 273/271 |
| 8,057,325 | B2 | 11/2011 | Dalton et al. | |

(Continued)

FOREIGN PATENT DOCUMENTS

JP   2009510852   3/2009

OTHER PUBLICATIONS

Goal-Line Technology, Wikipedia, Aug. 30, 2016, [retrieved from Internet at https://en.m.wikipedia.org/wiki/Goal-line_technology on Sep. 7, 2016] 9 pages.

(Continued)

*Primary Examiner* — Seng Heng Lim
(74) *Attorney, Agent, or Firm* — Hanley, Flight and Zimmerman, LLC

(57) ABSTRACT

Methods and apparatus for high speed location determinations are disclosed. An example apparatus includes at least two coils arranged along a zone of interest to generate a magnetic field, and a sensor to measure a change in the magnetic field associated with the at least two coils as an object of interest moves within or into the zone of interest. The example apparatus also includes a processor to determine a position of the object of interest based on the measured change.

23 Claims, 15 Drawing Sheets

(56) References Cited

U.S. PATENT DOCUMENTS

| | | | |
|---|---|---|---|
| 8,057,328 B2* | 11/2011 | Englert | A63B 24/0021 473/476 |
| 8,408,553 B2* | 4/2013 | Eskildsen | A63B 63/004 273/371 |
| 8,749,385 B2 | 6/2014 | Bernhard et al. | |
| 8,844,933 B2 | 9/2014 | Eskildsen | |
| 9,795,829 B2* | 10/2017 | Hartmann | A63B 24/0021 |
| 2006/0178236 A1 | 8/2006 | Mosbey | |
| 2007/0299625 A1* | 12/2007 | Englert | A63B 24/0021 702/150 |
| 2008/0085790 A1* | 4/2008 | Englert | A63B 24/0021 473/470 |
| 2008/0090683 A1 | 4/2008 | Englert et al. | |
| 2009/0072817 A1* | 3/2009 | Bucher | A63B 24/00 324/207.11 |
| 2009/0108835 A1 | 4/2009 | Englert et al. | |
| 2010/0181996 A1* | 7/2010 | Englert | A63B 43/00 324/207.22 |
| 2010/0321185 A1* | 12/2010 | Bernhard | B62B 5/0423 340/551 |
| 2011/0304497 A1 | 12/2011 | Molyneux et al. | |
| 2012/0040783 A1 | 2/2012 | Bucher | |
| 2014/0035566 A1 | 2/2014 | Arumugam et al. | |
| 2015/0285611 A1 | 10/2015 | Lowery et al. | |
| 2016/0107028 A1* | 4/2016 | Hartmann | H01Q 1/2216 324/207.22 |
| 2018/0304119 A1 | 10/2018 | Yang et al. | |

OTHER PUBLICATIONS

Fraunhofer IIS, "GoalRef—Goal-Line Technology," Fraunhofer Institute for Integrated Circuits IIS, Nov. 2013, 6 pages.

United States Patent and Trademark Office, "Restriction and/or Election Requirement", issued in connection with U.S. Appl. No. 15/495,673, dated Mar. 19, 2018, 6 pages.

Coxworth, "NFL may track footballs using magnetic fields," retrieved from [http://newatlas.com/football-tracking-magnetic-fields/32542/] on Apr. 24, 2017, dated Jun. 13, 2014, 4 pages.

Arumugam et al., "Two-dimensional position measurement using magnetoquasistatic fields," IEEE, Sep. 12-16, 2011, 4 pages.

Arumugam, "Position and Orientation Measurements using Magnetoquasistatic Fields," Carnegie Mellon University, Department of Electrical & Computer Engineering, dated Dec. 21, 2011, 156 pages.

Arumugam et al. "Three-Dimensional Position and Orientation Measurments Using Magneto-Quasistatic Fields and Complex Image Theory," IEEE Antennas and Propagation Magazine, vol. 56, No. 1, Feb. 2014, 14 pages.

International Searching Authority, "International Search Report", issued in connection with International Application No. PCT/US2017/045515, dated Nov. 15, 2017, 4 pages.

International Searching Authority, "Written Opinion", issued in connection with International Application No. PCT/US2017/045515, dated Nov. 15, 2017, 7 pages.

United States Patent and Trademark Office, "Non-Final Office action," issued in connection with U.S. Appl. No. 15/495,673, dated Jul. 17, 2018, 31 pages.

United States Patent and Trademark Office, "Non-final Office action," issued in connection with U.S. Appl. No. 15/495,673, dated Dec. 31, 2018, 11 pages.

The International Bureau of WIPO, "International Preliminary Report on Patentability," issued in connection with International Application No. PCT/US2017/045515, dated Mar. 19, 2019, 8 pages.

* cited by examiner

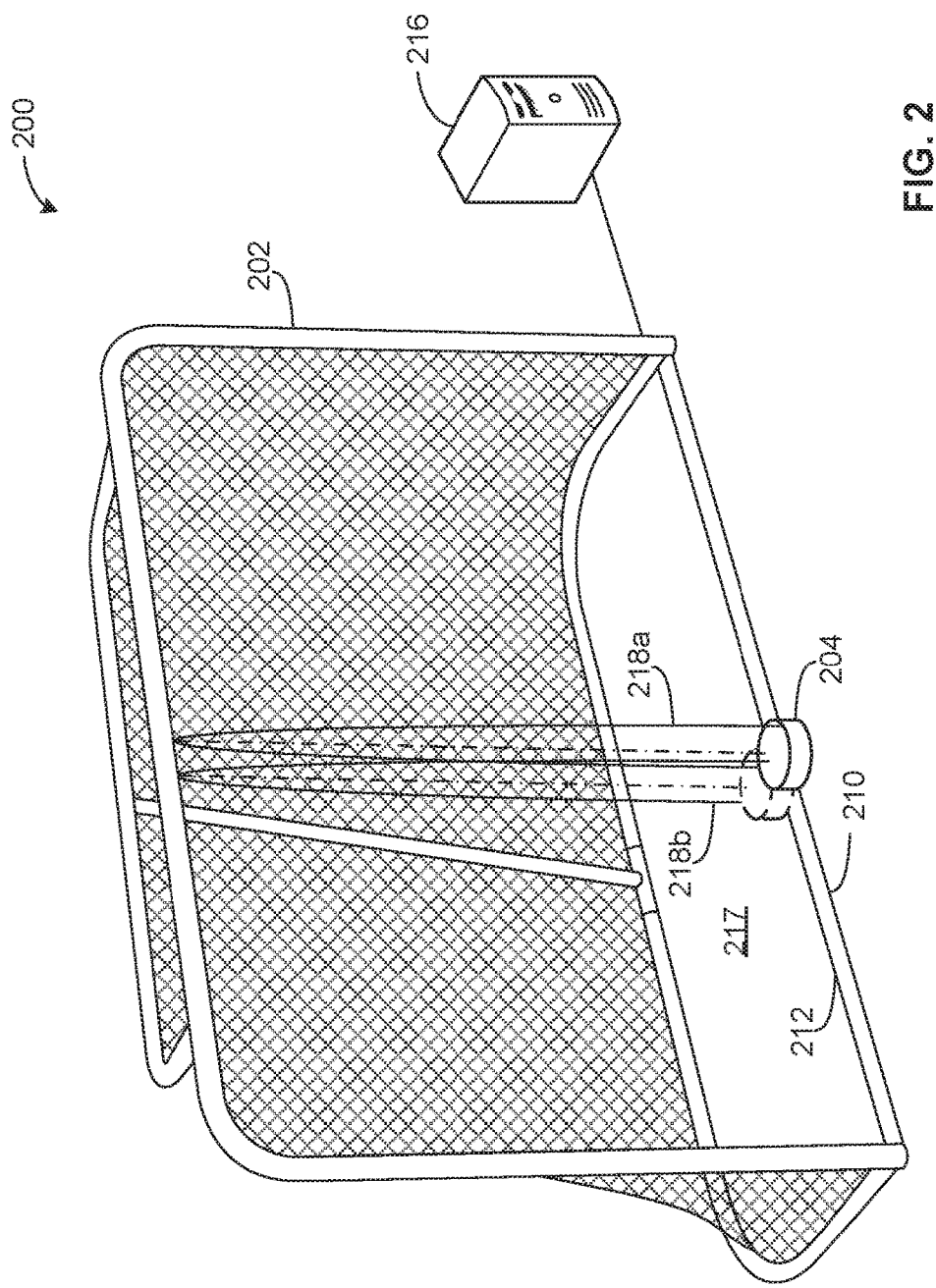

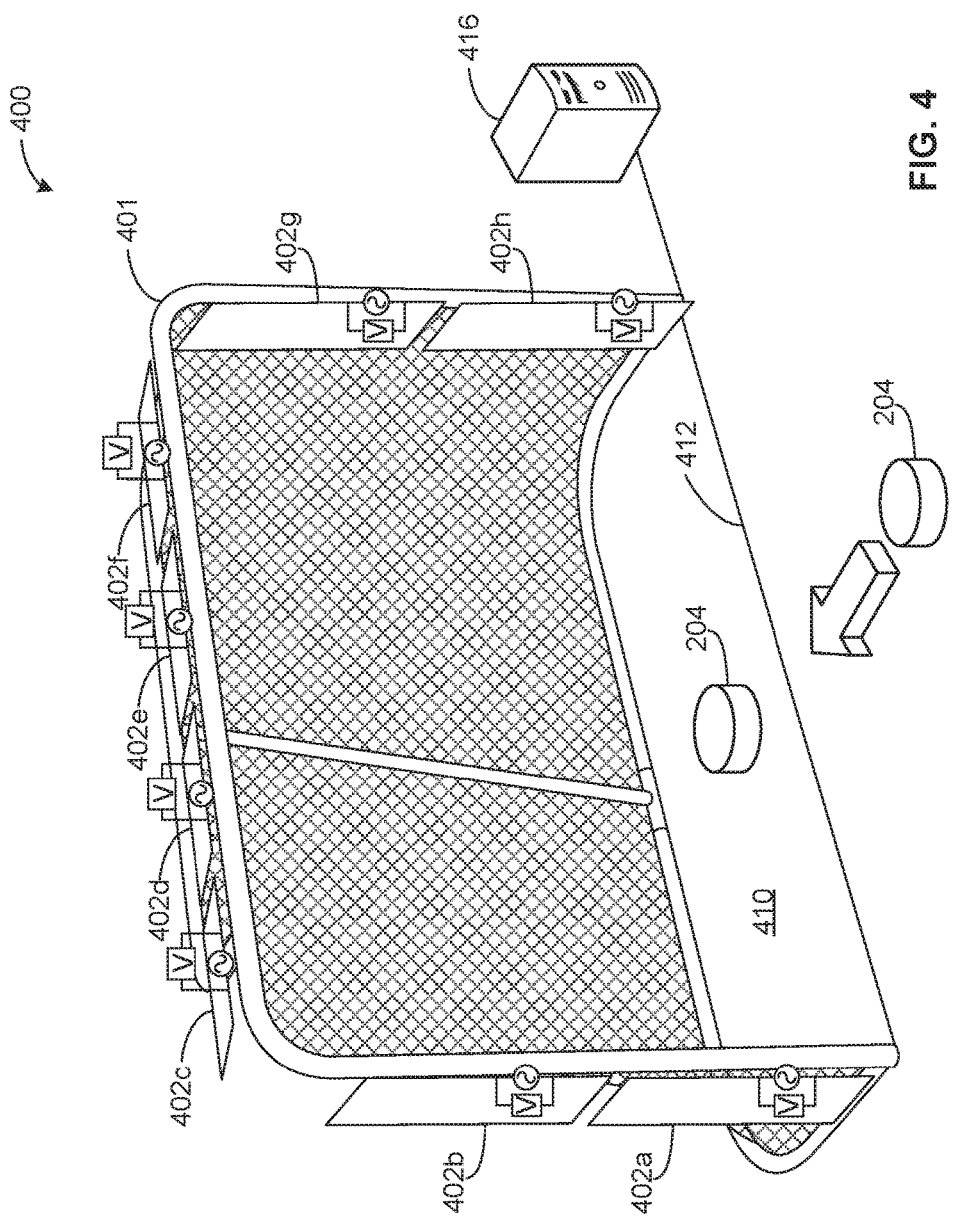

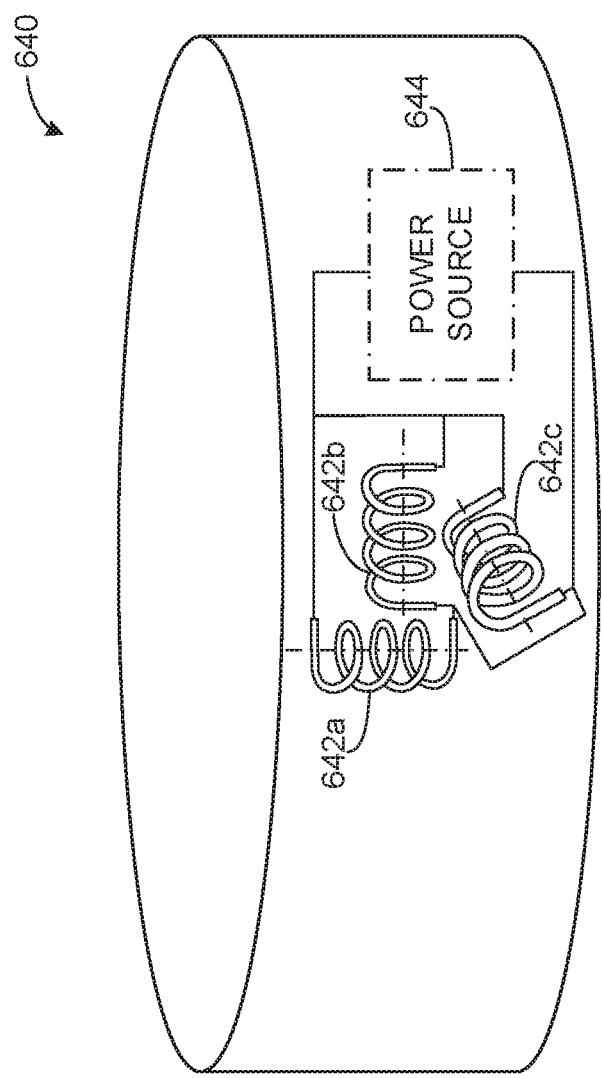

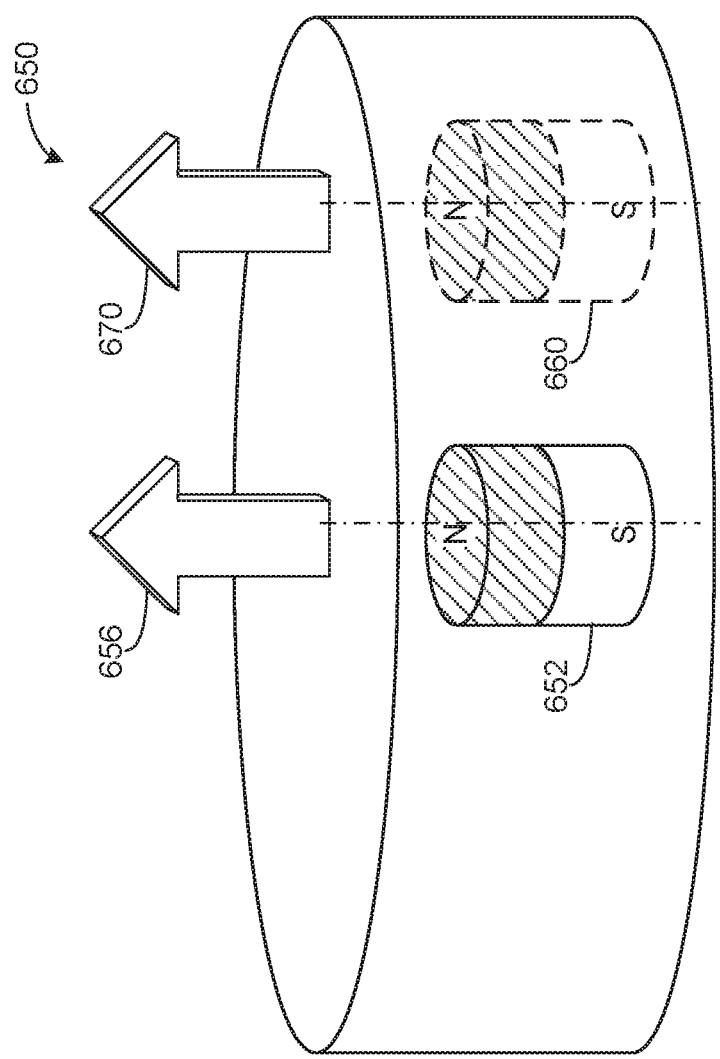

METHODS AND APPARATUS FOR HIGH SPEED LOCATION DETERMINATIONS

FIELD OF THE DISCLOSURE

This disclosure relates generally to location determinations, and, more particularly, to methods and apparatus for high speed location determinations.

BACKGROUND

In sporting events, such as hockey or soccer for example, an object of interest and/or sport implement such as a ball or a puck plays an important role in determining an outcome of a game. For example, whether a puck travels across a goal line is an important determination in hockey. However, the speed at which the puck travels (e.g., 100 miles per hour (mph)) can make this important determination very difficult based on visuals. For example, video replays captured by high-speed cameras are subject to occlusion, blurring and/or unclear/obstructed viewing angles that can that can make location determination of the puck difficult for scoring determinations.

Some known systems utilize magnets and/or magnetic fields to determine a location of a soccer ball near a goal line.

BRIEF DESCRIPTION OF THE DRAWINGS

FIG. 2 illustrates a first example sport tracking system constructed in accordance with teachings of this disclosure.

FIG. 4 illustrates another example sport tracking system constructed in accordance with teachings of this disclosure.

FIGS. 6A-6C illustrate example sport implements that may be used in the examples disclosed herein.

Figure 1:
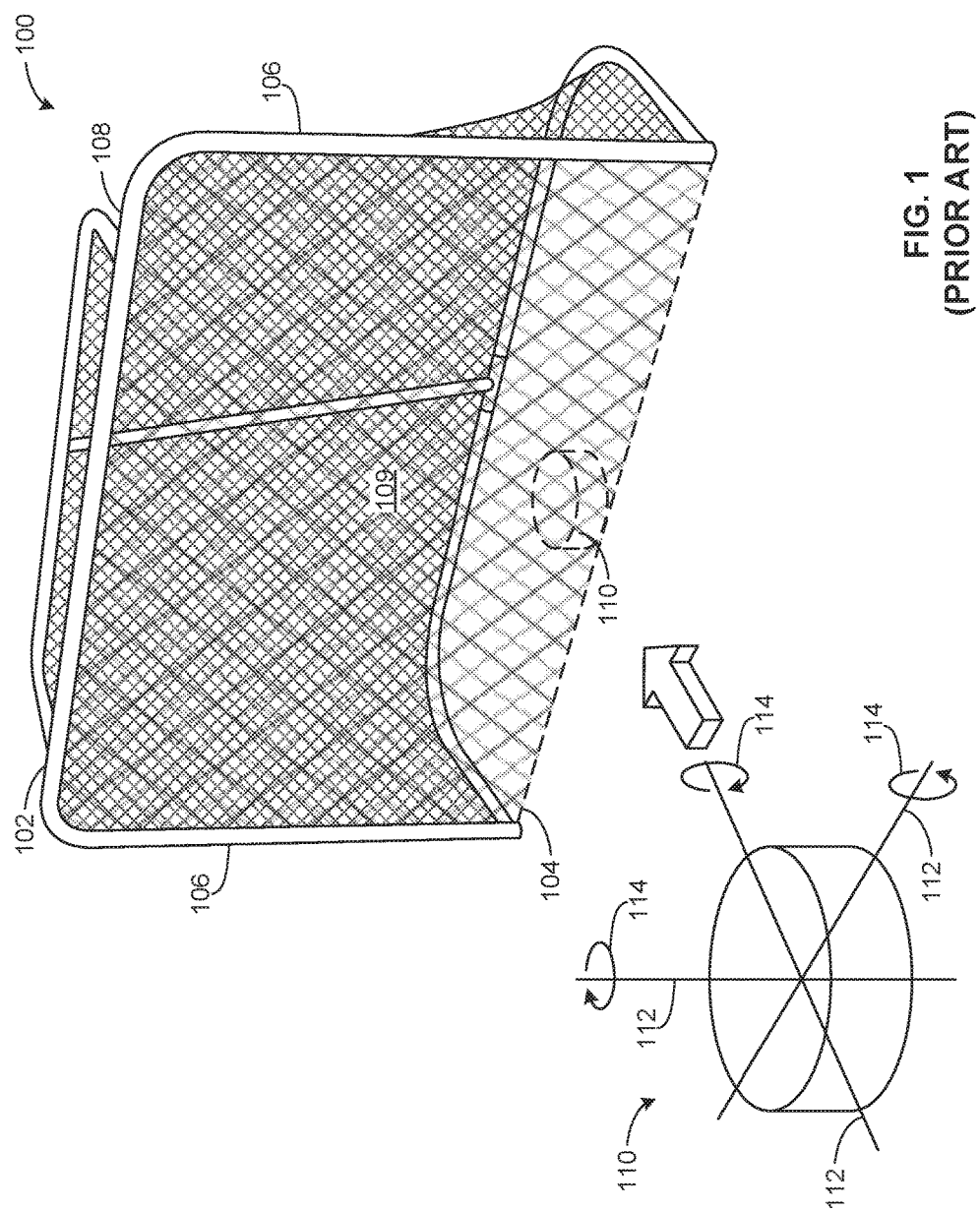
FIG. 1 illustrates an example sport application.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Methods and apparatus for high speed location determinations are disclosed. In sporting events (e.g., hockey, soccer, football, auto racing, running, etc.), an object of interest and/or sport implement such as a ball or a puck plays an important role in determining an outcome of a game. However, the speed at which these objects can travel (e.g., greater than 100 miles per hour (mph)) may make conditional determinations difficult (e.g., whether a team has scored). For example, video replays captured by high-speed cameras are subject to occlusion, blurring and/or unclear/obstructed viewing angles.

Some known positional tracking systems utilize magnets and/or magnetic fields to determine a location of a soccer ball near a goal line. However, these systems are not generally able to determine an exact location or orientation/spin of the ball and, instead, only generally indicate whether the ball has moved past a plane and/or a line (e.g., a goal line), but not whether an entire length/diameter of the ball has passed. Further, these known systems are only able to determine the location of the soccer ball within a few centimeters (cm) and cannot generally track movement at a high velocity and/or take measurements at a data rate sufficiently high to accurately track a fast moving object.

Examples disclosed herein enable cost-effective, highly accurate and quick measurements of an object of interest (e.g., a ball, a puck, a person, a vehicle, a drone, a robot, etc.). Some such examples disclosed herein utilize one or more coils spatially arranged in conjunction with a magnetic field sensor to determine a highly precise location of a sport implement (e.g., a hockey puck, a ball, etc.). In some such examples, a magnetic field with a high corresponding magnetic field gradient is generated. As a result, such examples can accurately determine whether any or all of the sport implement has passed a plane (e.g., whether an entire length of the sport implement has passed the plane). In some examples, a precise measurement of location of the sport implement is determined (e.g., by determining position location beyond simply whether the sport implement has broken/passed a plane). Additionally or alternatively, in some examples, a trajectory (e.g., a projectile trajectory), a spin, a velocity and/or an orientation/tilt is determined.

As used herein, the term "sport implement" encompasses objects such as balls (e.g., soccer balls, footballs, golf balls, etc.), pucks (e.g., hockey pucks), automobiles, boats, drones in which location movements are relevant to outcome determinations, including scoring determinations. As used herein, the term "zone of interest" refers to a region that is to be monitored for a presence and/or movement of an object, such as an area, a line (e.g., to be passed), a surface and/or a volume, etc. For example, the term "zone of interest" may encompass a goal line, a goal structure, a net, a finish line, a field goal upright and/or a foul line, etc.

FIG. 1 illustrates an example sport application. According to the illustrated example, a goal (e.g., a hockey goal) 100 includes frame 102 with uprights 106 as well as a crossbar 108. In this example, the uprights 106 as well as the cross bar 108 define a zone of interest 109, which can be a plane, but in this example is a volume. In this example, the zone of interest 109 is a region pertinent to a determination of whether a score/goal has been made.

As can be seen in the illustrated view of FIG. 1, an example puck 110 is shown in detail. The example puck 110 has multiple axes (e.g., orthogonal axes in x, y and z coordinate systems) of movement 112 as well as axes (e.g., orthogonal axes) of rotation 114. In addition to determining whether the puck 110 has entered the zone of interest 109, examples disclosed herein may be also used to track position(s), speed, acceleration and/or rotation(s) of the puck 110. In some examples, the spin along any or all of the axes 114 as well as a projectile velocity (e.g., as the puck 110 flies above or along a surface) is also determined and/or calculated.

In this example, whether an entire length/diameter of the example puck 100 has passed a front plane of the region of interest 109 is pertinent to whether a score (e.g., a goal) has been made. Accordingly, examples disclosed herein not only can determine whether the puck 110 has entered the zone of interest 109, but also may determine whether an entire diameter/length of the puck 110 has entered the zone of interest 109 (an entire length of the puck 110 within the zone of interest 109) and a time and/or time differential history associated with such a movement.

While examples described herein are shown in the context of hockey, teachings of this disclosure may be applied to many other sport application or non-sport application(s). For example, teachings of this disclosure may be applied to football to determine whether a football, which has a generally non-axisymmetric oblong shape, has broken an end zone plane. Additionally or alternatively, teachings of this disclosure may be used to determine a projectile trajectory of the football and/or a proximity of the football to an upright during a field goal attempt, for example. Beyond sport applications, teachings of this disclosure may be applied to location/movement tracking of objects such as fast moving drones, robots, items moving through a warehouse, etc.

FIG. 2 illustrates an example sport tracking system 200 constructed in accordance with the teaching of this disclosure. The sport tracking system 200 of the illustrated example includes a goal frame 202, a puck (e.g., a magnetic puck) 204, which is depicted at two different times (time 1 in solid, time 2 in dashed lines), a first coil 210, and a second coil 212. In this example, the puck 204 is communicatively coupled (e.g., wirelessly coupled) to an analyzer 216. Additionally or alternatively, the first coil 210 and the second coil 212 are communicatively coupled to an analyzer 216. According to the illustrated example, the sport tracking system 200 is used to determine whether and/or at what time an entire length/diameter of the puck 204 has entered (e.g., passed a front plane of) a zone of interest 217 defined by the goal frame 202. Numerous examples of sport implements, which are shown as pucks, but can be any ball or the like, are described below in detail below in connection with FIGS. 6A-6C.

To determine whether the entire length of the puck 204 has entered the zone of interest 217, a change in a magnetic field and/or a magnetic field measurement exceeding a threshold is detected (e.g., detected by the puck 204) as the puck 204 moves past the first coil 210 and/or the second coil 212. In this example, the first coil and the second coil 212 generate a magnetic field due to current passing therethrough. The example puck 204 includes a magnet and/or coil that senses and/or varies (e.g., passively varies) the magnetic field generated by the first coil 210 and/or the second coil 212. For example, the puck 204 may sense a magnetic field gradient of the generated magnetic field. According to the illustrated example, a first peak 218a in the magnetic field (e.g., a high magnetic field differential and/or change in the magnetic field) is measured/observed when the puck 204 and/or a center axis of the puck 204 passes the first coil 210. Similarly, a second peak 218b is measured/observed when the puck 204 and/or the center axis of the puck 204 passes the second coil 204. As a result, the analyzer 216 determines whether/when the puck 204 has fully entered the zone of interest 217. In some examples, this determination is at least partially based on a known diameter/length of the puck 204. In other words, in this example, detecting both of the peaks 218a, 218b enables a determination of whether the entire puck 204 has entered the zone of interest 217.

In some examples, the first coil 210 and the second coil 212 are generally parallel and spaced by a distance sufficient (e.g., relative to the diameter of the puck 204) to precisely determine whether the puck 204 has fully entered the zone of interest 217. In some examples, a speed and/or velocity of the puck 204 is also determined. In some such examples, a time differential between the first peak 218a and the second peak 218b is used to calculate a speed of the puck 204. In some examples, the puck 204 has a coil and/or magnet that causes an upward dipole to be formed (upward in the view of FIG. 2). In some examples, the puck 204 has a sensor (e.g., a magnetic field sensor, an integrated chip magnetic field sensor) to sense the gradient of the magnetic field. Additionally or alternatively, in some examples, the puck 204 is integral with the analyzer 216.

FIGS. 3A-3D illustrate example coil arrangements that may be implemented to generate magnetic fields with relatively large magnetic field gradients so that an object of interest such as the example puck 204 can be tracked with high positional accuracy.

Figure 3A:
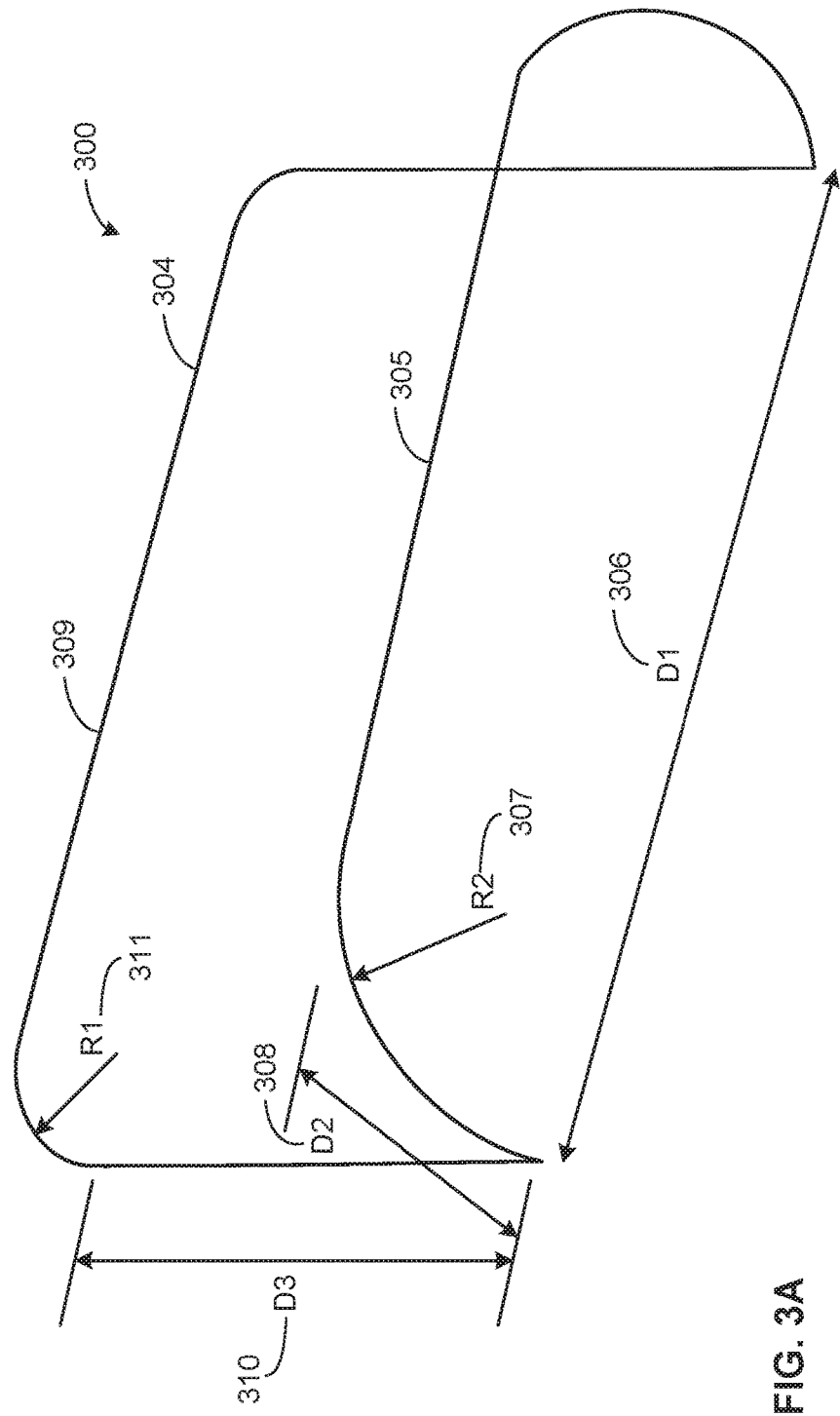
FIGS. 3A-3D illustrate example coil arrangements that may be implemented in the example sport tracking system of FIG. 2.

Turning to FIG. 3A, an above-ground (e.g., an above-playing field, an above-ice) single coil arrangement 300 is shown having curvature in multiple planes. According to the example of FIG. 3A, the coil arrangement 300 includes a path 304 having a first arcuate portion 305 that is generally defined by a first distance (D1) 306, a radius (R2) 307 as well as a second distance (D2) 308. In this example, the first arcuate portion 305 is placed onto the ground. The path 304 of the illustrated example also defines a second arcuate portion 309, which is generally orthogonal to the first arcuate portion 305. The example second arcuate portion 309 is defined by the first distance 306, a third distance/height (D3) 310 and a radius (R1) 311.

Figure 3B:
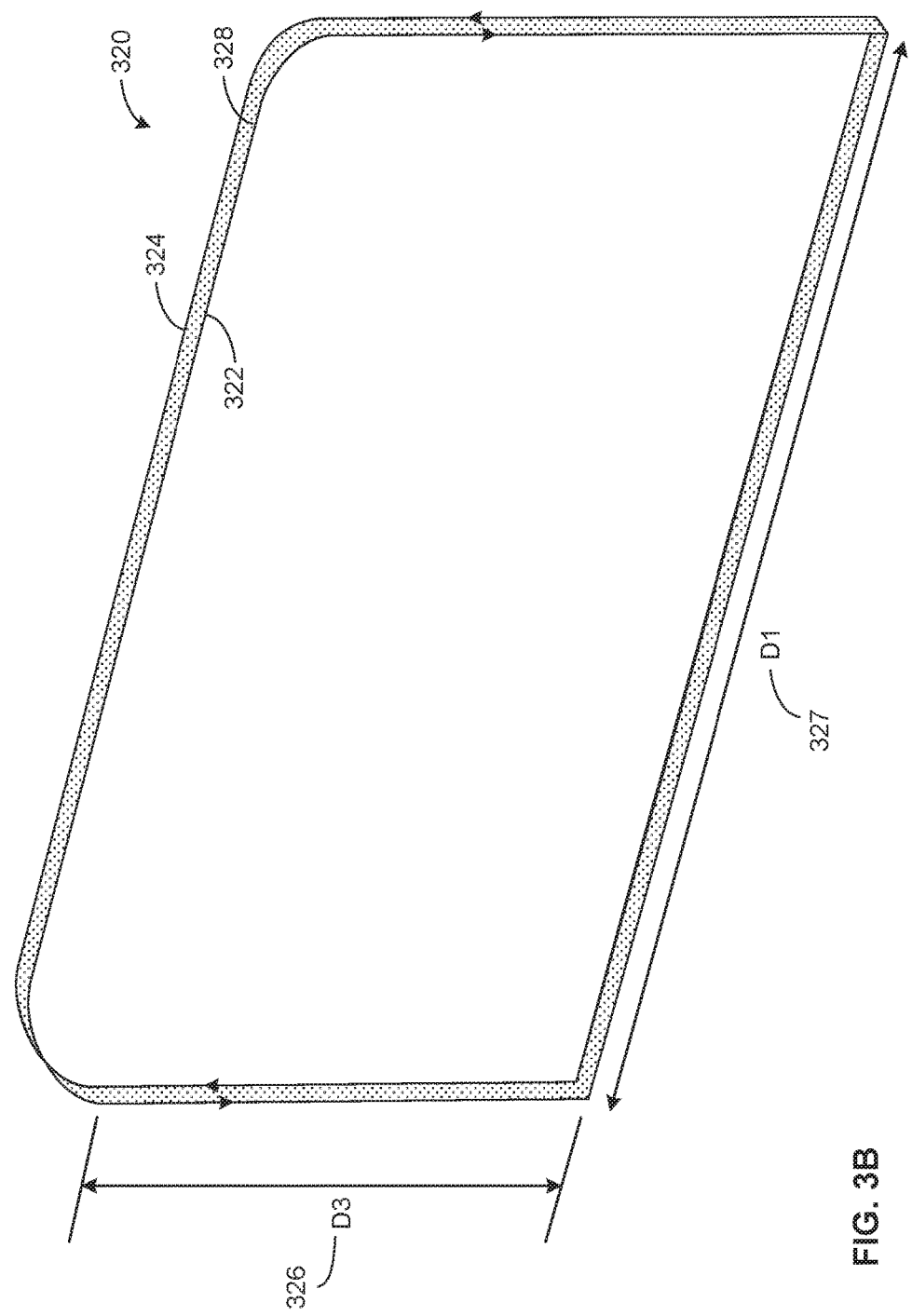

Turning to FIG. 3B, an example dual coil arrangement 320 is shown. In contrast to the example coil arrangement 300 described above in connection with FIG. 3A, multiple coils are used in the example of FIG. 3B. In particular, the dual coil arrangement includes a first coil 322 and a second coil 324, both of which exhibit a generally rectangular shape defined by a first length/height (D3) 326 and a second length (D1) 327. In particular, the generally rounded rectangular shape of the first coil 322 and the second coil 324 may be based on an opening of a goal (e.g., the coil arrangement encompasses uprights as well as a crossbar). In this example, the first coil 322 and the second coil 324 have generally identical paths/curvatures to one another. In other words, the second coil 324 mirrors the first coil 322. The second coil 324 is offset (e.g., on a parallel offset plane) from the first coil 322. As a result, the first coil 322 and the second coil 324 of the illustrated example define a region 328 (shown as dotted in the view of FIG. 3B) therebetween having a relatively high magnetic flux gradient.

In some examples, current flowing through the first coil 322 flows in phase shift (e.g., in an opposite direction, out of phase, etc.) from that of the second coil 324. In some examples, the second coil 324 traverses a path that is distinct from the first coil 322 (e.g., has at least one different length from the first length 326 and/or the second length 327). Additionally or alternatively, the magnitude of current flowing through the second coil 324 may be different from that flowing through the first coil 322.

Figure 3C:
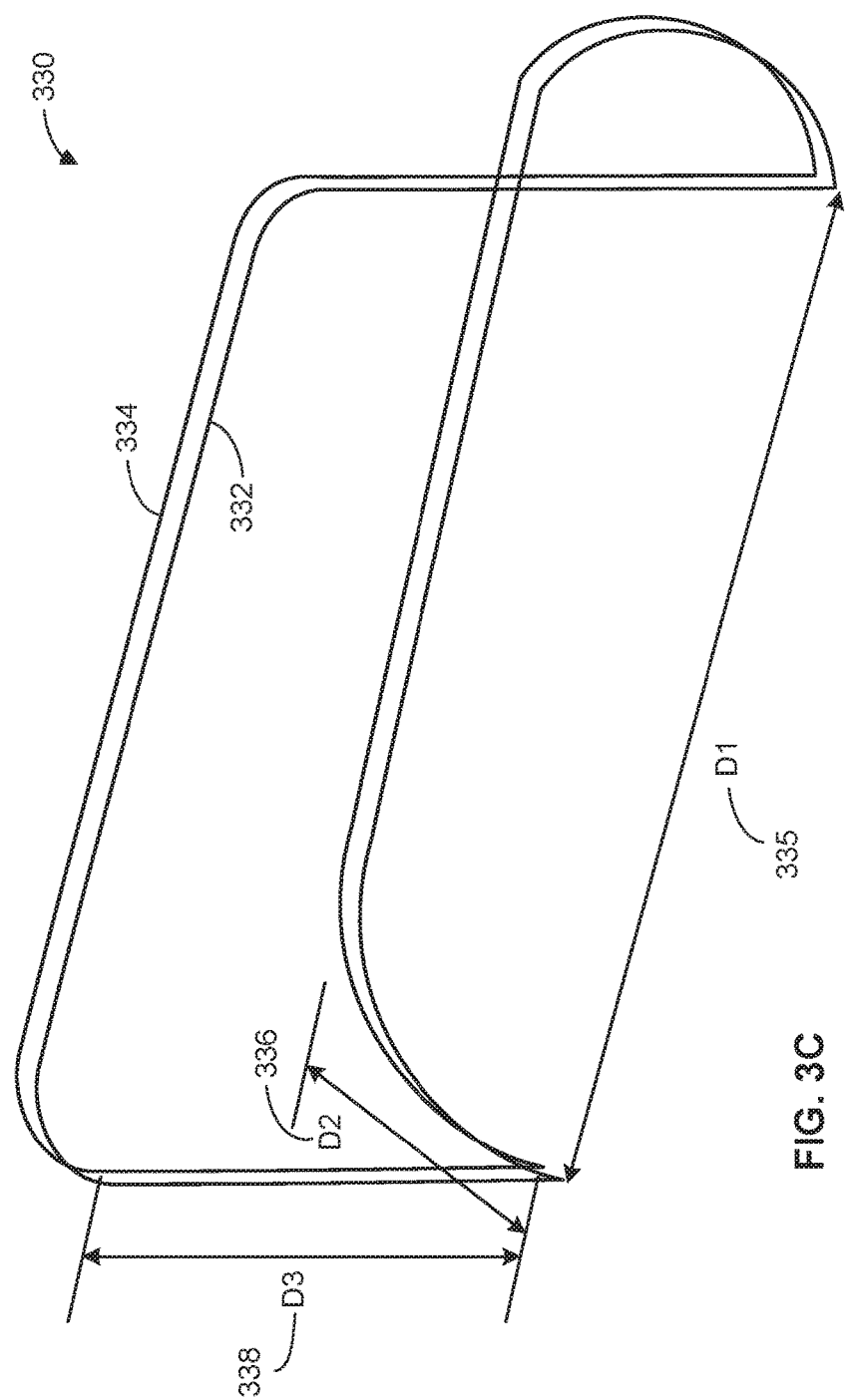

Turning to FIG. 3C, an example multiple coil arrangement 330 is shown. The coil arrangement 330 of the illustrated example includes a first coil 332 and a second coil 334.

Similar to the example coil arrangement 320 of FIG. 3B, the first coil 332 and the second coil 332 follow generally parallel offset paths relative to one another. However, in contrast to the example arrangement 320 of FIG. 3B, the first coil 332 and the second coil 334 both have multiple arcuate curves defined in multiple planes. In this example, the first coil 332 and the second coil 334 follow paths generally defined by a first distance/width (D1) 335, a second distance/depth (D2) 336 and a third distance/height (D3) 338. As a result, the coil arrangement 330 may be mounted and/or placed along multiple components of a goal post, for example, including a rear portion of the goal post.

Figure 3D:
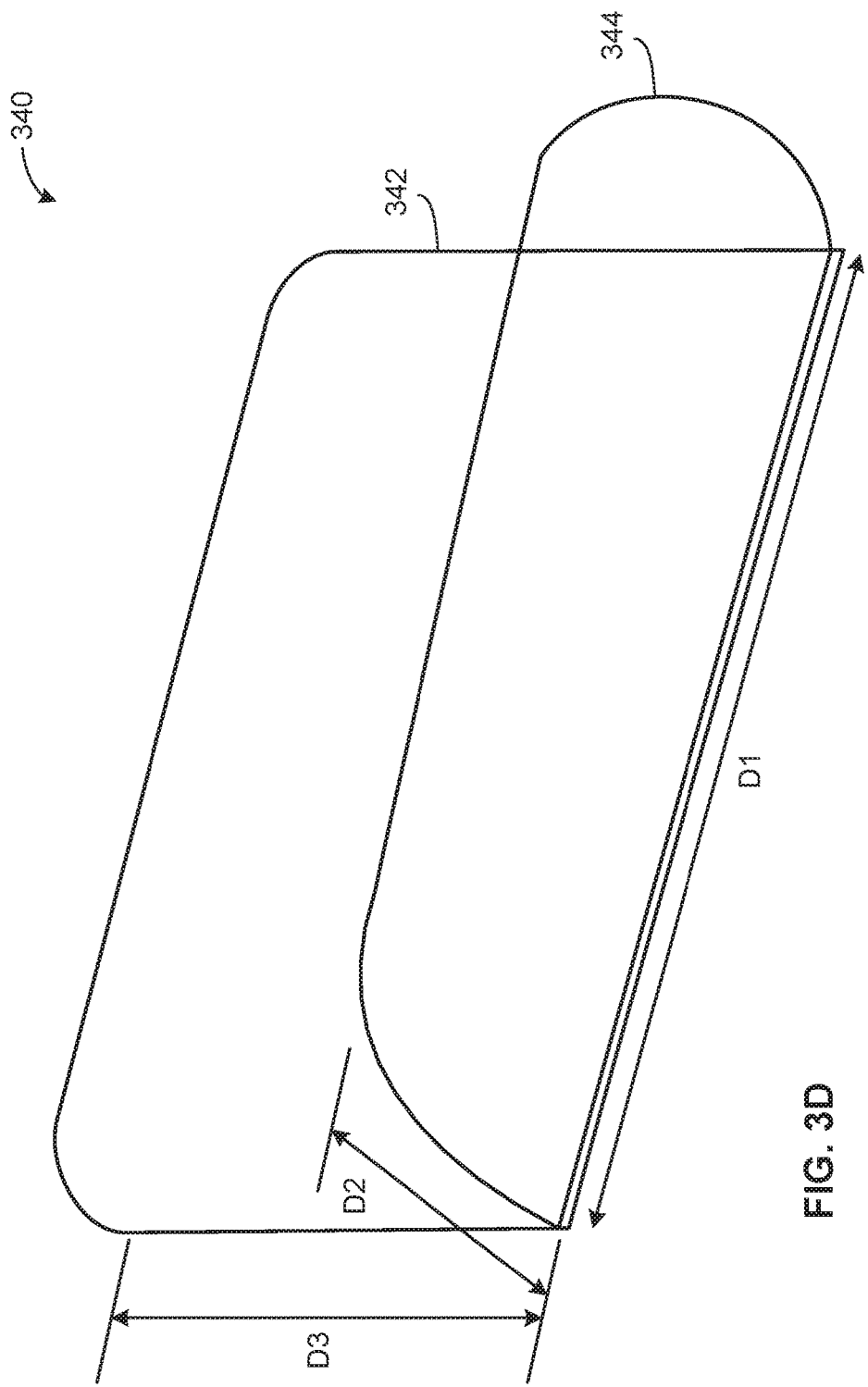

FIG. 3D illustrates yet another example coil arrangement 340, which is similar to the coil arrangement 330 described above in connection with FIG. 3C. According to the illustrated example, the coil arrangement 340 includes a first coil 342 and a second coil 344, both of which generally define rounded rectangular shaped loops disposed in different planes (e.g., orthogonal planes).

FIG. 4 illustrates another example sport tracking system 400 constructed in accordance with the teachings of this disclosure. In contrast to the example coil arrangements/configurations 300, 320, 330, 340 described above in connection with FIGS. 3A-3D which utilize looped loops surrounding a goal or goal opening (e.g., surrounding overall structures such as a goal opening), the example tracking system 400 of FIG. 4 utilizes discrete and/or independent coil segments/circuits arranged about the goal. In particular, the sport tracking system 400 of the example of FIG. 4 includes a goal frame 401 supporting multiple closed coils (e.g., discrete coil segments) 402 (shown as coils 402a-402h). The coils 402 of the illustrated example detect a presence of the puck 204 as it moves into and/or within a zone of interest 410 defined by a goal line 412. In this example, the tracking system 400 includes an analyzer 416. In this example, the coil 402 each have a respective voltmeter and/or ammeter.

To detect a presence of the puck 204 and/or whether an entire length/diameter of the puck 204 has entered the zone of interest 410, the coils 402 generate a magnetic field using a constant current and/or a constant voltage. When the puck 204 is proximate and/or enters the zone of interest 410, the coils 402 detect a change in current and/or voltage caused by the relative proximity of the puck 204 to corresponding one(s) of the coils 402 as the puck 204 moves into or within the zone of interest 410. In particular, multiple measurements from the coils 402 of the illustrated example are used by the analyzer 416 to calculate a position of the puck 204 and/or whether an entire length of the puck 204 has passed the goal line 412. In other words, in this example, measured changes/differentials in current and/or voltage values amongst the coils 402 are used to calculate the position of the puck 204 relative to the frame 401. In this example, the puck 204 is inductively powered by the generated magnetic field from the coils 402. In other examples, the puck 204 is powered by a battery and/or internal circuitry.

According to the illustrated example, the sport tracking system 400 can also make a precise determination of a position of the puck 204 in multiple directions of a three-dimensional coordinate system (e.g., a position determination in x, y and z dimensions). In this example, the analyzer 416 utilizes a relative positioning of each of the coils 402 along the goal frame 401 in conjunction with magnetic field measurements from a set of the coils 402 to calculate (e.g., via triangulation) a precise position of the puck 204 at a given time. In some examples, the analyzer 416 may use a least-squares fit to determine a position of the puck 204 in three different perpendicular/orthogonal directions of a coordinate system. Additionally or alternatively, the analyzer 416 can also calculate a velocity (e.g., a velocity vector), an orientation (e.g., in multiple directions), a projectile motion, an acceleration and/or a spin in any axial direction of the puck 204. Additionally or alternatively, the analyzer 416 determines whether a threshold magnetic field and/or magnetic field differential has been measured as the puck 204 moves into or within the zone of interest 410.

In some examples, only a subset of the coils 402 generate a magnetic field. In some other examples, the coils 402 do not generate a significant magnetic field while a coil loop such as the coil 322 is used to generate a high gradient magnetic flux (e.g., the coils 402 are used as magnetic sensors while the coil loop is used to generate a significant magnetic field). Additionally or alternatively, in some examples, some of the coils 402 are placed along the goal line 412 (e.g., under a surface on which the goal frame 401 sits). In some examples, the position determination puck is made at 1,000 Hertz (Hz) or faster. In some examples, a change in current may be measured. In some examples, at least a portion of the coils 402 are sized and/or powered differently from the other coils 402 to adapt sensitivity and/or detection range based on varying applications and/or desired needs.

While eight coils are shown in the illustrated example of FIG. 4, any appropriate number (e.g., two, ten, fifty, one hundred, etc.) of the coils 402 may be used based on the application, speed of an object of interest, whether a separate loop coil is used to generate the magnetic field instead of sensing coils, etc. Examples disclosed herein may be implemented using alternating current (AC) or direct current (DC) to generate the magnetic fields.

Figure 5:
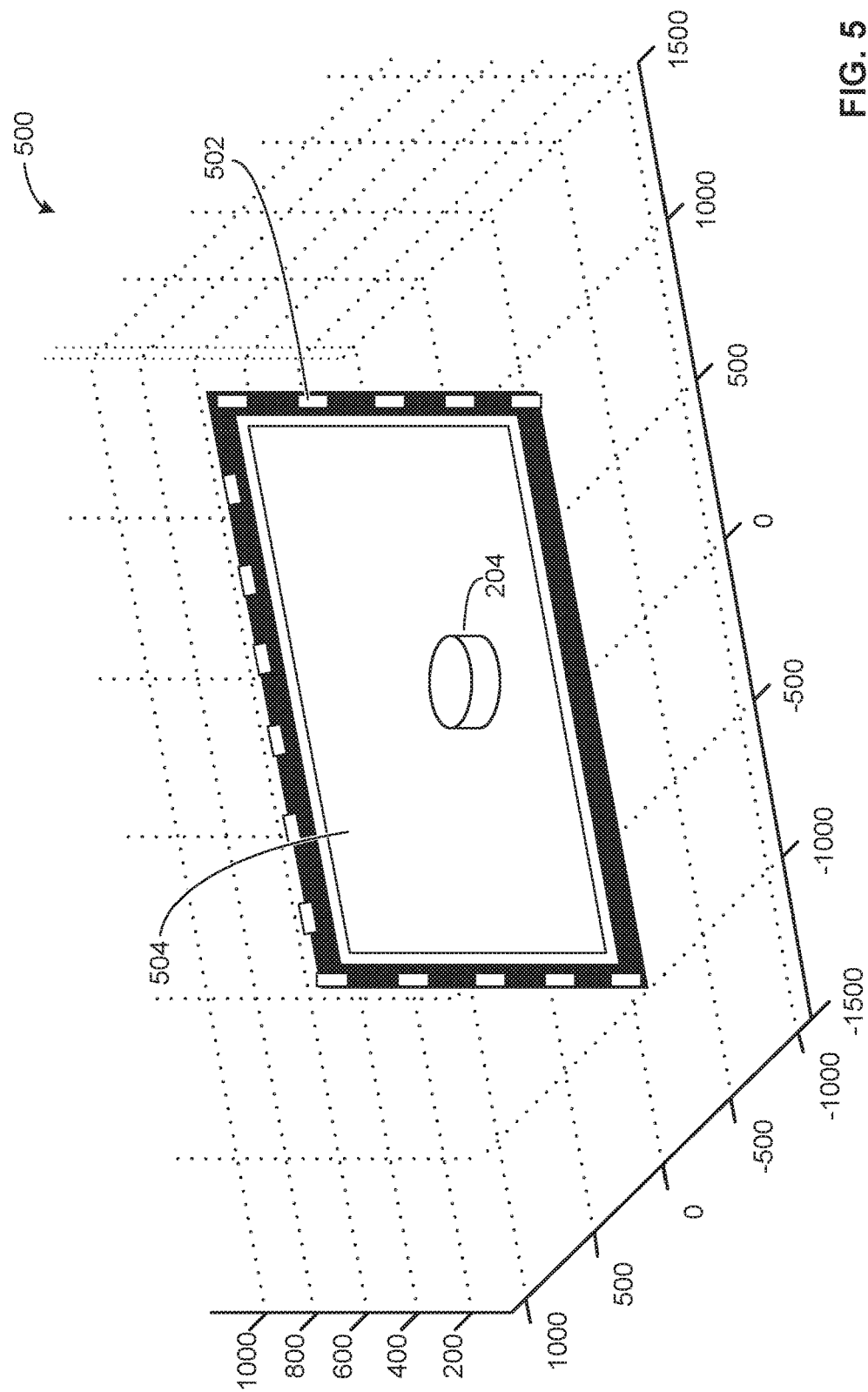
FIG. 5 is a graph depicting a highly localized magnetic field gradient that may be generated by examples disclosed herein.

FIG. 5 is a graph 500 with three positional axes depicting a highly localized magnetic field that may be generated by one or more of the examples disclosed herein. In this example, the magnetic field is generated using AC current in a coil disposed around an opening of a goal, as depicted in FIGS. 3A-3D (e.g., looping along a cross bar and uprights). According to the illustrated example, sensor coils and/or magnetic sensors (e.g., discrete magnetic sensors arranged along the opening of the goal) 502 monitor and/or generate a magnetic flux plane 504 with a large magnetic field gradient. In this example, the flux plane 504 is generated at a face of a goal. In some examples, the sensor 502 may be used to determine a position (e.g., a three-dimensional position) of the puck 204, which may be passively or actively powered.

In this example, the magnetic puck 204 includes a magnet and/or coil that varies (e.g., passively varies) the magnetic field around the opening of a goal. In some examples, the analyzer 216, 416 utilizes the sensor 502 measurements (e.g., the change of magnetic field) to calculate (e.g., via triangulation) a precise position of the puck 204 at a given time. In some examples, the analyzer 216, 416 may use a least-squares fit to determine a position of the puck 204 in three different perpendicular/orthogonal directions of a coordinate system. Additionally or alternatively, the analyzer 216, 416 calculates a velocity (e.g., a velocity vector), an orientation (e.g., in multiple directions), a projectile motion, a speed and/or a spin in any axial direction of the puck 204.

Figure 6A:
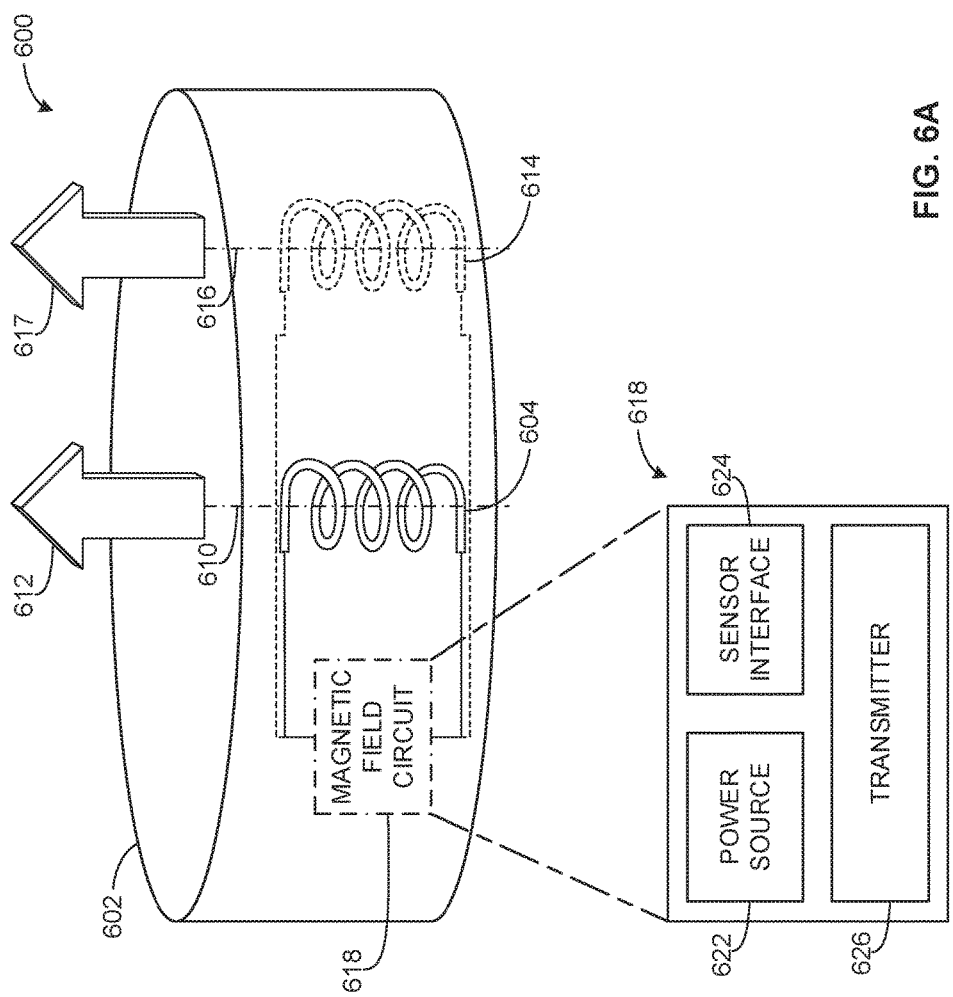

FIGS. 6A-6C illustrate example sport implements that may be used in examples disclosed herein. Any of the examples associated with FIGS. 6A-6C may be used to implement the puck 204 shown above in connection with FIGS. 2, 4 and/or 5.

Turning to FIG. 6A, an example puck 600 is shown. The puck 600 of the illustrated example includes a body (e.g., a housing structure) 602 and a coil (e.g., a passively inductive coil) 604, which is disposed proximate a center axis 610 of the puck 600. According to the illustrated example, the coil 604 defines a magnetic dipole 612, which can be used by any of the examples disclosed herein to locate a center of the puck 600 and/or an orientation of the puck 600. In some examples, the puck 600 includes an additional coil 614 with a corresponding off-center axis 616 and a respective dipole 617. In examples where the additional coil 614 is utilized instead of only the single coil 604, additional determination(s) of orientation, position and/or angular velocity of the example puck 600 may be made. For example, if the puck 600 is spinning about the center axis 610, measuring changes in a magnetic field caused by the second coil 614 enables determination of the spin direction and/or spin rate of the puck 600 about the axis 610. While the coil 612 and the coil 614 are oriented generally parallel in this example, in some other examples, the coil 614 is positioned in a different orientation from the coil 604.

In this example, the puck 600 is passively powered and does not necessitate internal powering and/or internal circuitry. However, in other examples, the puck 600 includes a magnetic field circuit 618, which includes a power source 622 in some examples (e.g., for actively powered examples), a sensor interface 624 and a transmitter (e.g., a radio transmitter). In some such examples, the coil 604 acts as a sensor by measuring a magnetic field gradient, magnetic field peak(s) and/or value as the puck 600 travels through a relatively large magnetic field gradient. In such examples, the sensor interface 624 measures and/or analyzes magnetic field measurements from the coil 604 (e.g., determines measured peaks in measured magnetic field values). In some examples, the transmitter 626 may be used to transmit the magnetic field measurements and/or determinations as the puck moves through a region having a magnetic field that exceeds a threshold, for example. In some examples, the sensor interface 624 may be a standalone magnetic sensor (e.g., independent from the coil 604), which measures the magnetic field in one to three dimensions, regardless of whether the coil 604 is present.

FIG. 6B illustrates an example puck 640, which may be passively/inductively powered or internally powered. According to the illustrated example, the puck 640 includes three coils 642a, 642b, 642c. In this example, the coils 642a, 642b, 642c are oriented orthogonally to one another. In particular, the central axes of the coils 642a, 642b, 642c are perpendicular. As such, the magnetic dipoles of the coils 642a, 642b, 642c are also perpendicular. In examples where the puck 640 is actively powered, the puck 650 may also include a power source (e.g., a battery, a solar cell, a fly wheel, etc.) 644.

In this example, the coils 642a, 642b, 642c are identical to one another. However, in other examples, the coils 642a, 642b, 642c are distinct. In some examples, the puck 640 may also include the magnetic field circuit 618 described above in connection with FIG. 6A. In some examples, the coils 642a, 642b, 642c are co-molded and/or over-molded into the puck 640.

Turning to FIG. 6C, yet another example puck 650 is shown. The example puck 650 includes a permanent magnet 652 with a corresponding dipole 656. In this example, the magnet 652 is disposed proximate and/or at a diametric center axis of the puck 650 (e.g., a center axis of the magnet 652 is aligned with a geometric center and/or center axis of the puck 650). In some examples, the puck 650 also includes a second permanent magnet 660 with a corresponding second dipole 670. As described above in connection with the additional coil 614 of FIG. 6A, the second magnet 660 can be used for further determination(s) of orientation and/or spin.

While two magnets are shown in the example of FIG. 6C, any appropriate number of magnets may be used (e.g., four, six, fifteen, fifty, etc.) dependent on the application. While discrete magnets are shown in this example, in some examples, the magnetic characteristics of the puck 650 may be defined by embedded magnetic materials along portion(s) of the puck 650 (e.g., co-molded or over-molded magnetic materials disposed in portions of the puck 650). In some examples, the entire puck 650 is composed of magnetic material(s) (e.g., magnetic materials oriented to define an appropriate magnetic dipole relative to an overall structure/shape of the puck 650).

Figure 7:
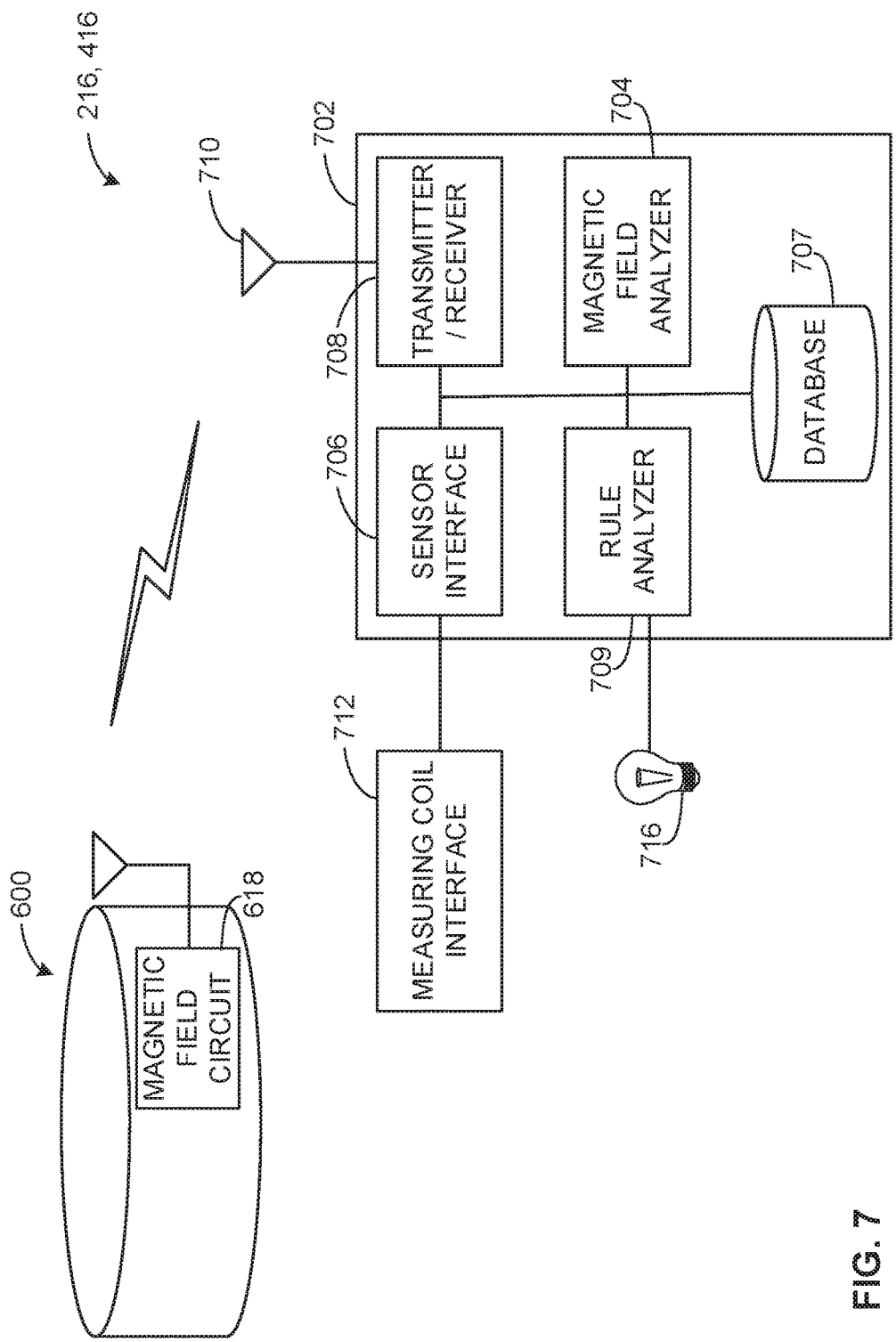
FIG. 7 illustrates an example implementation of an analyzer of FIGS. 2 and/or 4.

FIG. 7 illustrates an example implementation of the analyzer 216 or the analyzer 416 of FIGS. 2 and/or 4. The analyzer 216, 416 of the illustrated example includes a tracker 702, which includes a magnetic field analyzer 704, a sensor interface 706, a database 707, a transmitter/receiver (e.g., a transceiver) 708 and a rule analyzer 709. In some examples, the tracker 702 also includes an antenna 710 in communication with the transmitter/receiver 708. In this example, the sensor interface 706 is communicatively coupled to a measuring coil interface 712. Further, in some examples, the example antenna 710 is in wireless communication with the magnetic field circuit 618 of the puck 600. In some examples, the analyzer 216, 416 also includes an output (e.g., a light, a bulb, a display, etc. 716). In some examples, the magnetic field circuit 618 includes magnetic field sensor(s)

In operation, the example measuring coil interface 712 measures a magnetic field, magnetic field peaks and/or a change in a generated magnetic field (e.g., over a time duration) that is triggered by movement of the puck 600 within the vicinity of the coils described above to determine whether the puck 600 (e.g., the object of interest) has entered a zone of interest. Alternatively, in some examples, the puck 600 measures the magnetic field and/or a change in the magnetic field. The measuring coil interface 712 of the illustrated example relays the magnetic field measurement(s) from the coil(s) to the sensor interface 706. In some examples, the measuring coil interface 712 measures magnetic field measurements at multiple magnetic field sensors (e.g., any of the magnetic field coils described above). These measurements are used by the magnetic field analyzer 704 to calculate a position of the puck 600. In some examples, the magnetic field analyzer 704 accesses the database 707 to obtain information related to individual sensor placement along the zone of interest so that a least squares analysis may be performed to triangulate the location of the puck 600. In some examples, a reiterative process is used by the magnetic field analyzer to verify the calculated position of the puck 500. In some examples, the rule analyzer 708 receives location data (e.g., locational data related to time) to make conditional determinations based on game/sport rules, such as whether to signal a goal or the like has occurred (e.g., an entire length of the puck 600 has entered a goal and/or a zone of interest associated with the goal).

In some examples, the magnetic field analyzer 704 utilizes magnetic field measurements made at the puck 600 and transmitted to the tracker 702. In such examples, at least one coil of the puck 600 (e.g., the coil 604) is used to measure a magnetic field that exceeds a threshold and/or multiple magnetic field peaks encountered and the puck 600 relays this corresponding information/data to the tracker 702 by transmitting radio frequency signals from the magnetic field circuit 618 to the antenna 710. Additionally or alternatively, the magnetic field analyzer 704 of the illustrated example utilizes measurements from at least one coil communicatively coupled to the measuring coil interface 712 in conjunction with the magnetic field measurements from the puck 600 to determine a position and/or orientation of the puck 600.

In this example, the rule analyzer 709 utilizes data analyzed and/or processed at the magnetic field analyzer to make a conditional determination. As such, the rule analyzer 709 of the illustrated example determines whether a goal has occurred according to an appropriate rule set and outputs this determination. In some examples, this output is implemented as a displayed light and/or flashing at the output 716.

While an example manner of implementing the analyzer 216, 416 of FIGS. 2 and/or 4 is illustrated in FIG. 7, one or more of the elements, processes and/or devices illustrated in FIG. 7 may be combined, divided, re-arranged, omitted, eliminated and/or implemented in any other way. Further, the example tracker 702, the example magnetic field analyzer 704, the example sensor interface 706, the example database 707, the example transmitter/receiver 708, the example rule analyzer 709, the example measuring coil interface 712 and/or, more generally, the example analyzer 216, 416 of FIG. 7 may be implemented by hardware, software, firmware and/or any combination of hardware, software and/or firmware. Thus, for example, any of the example tracker 702, the example magnetic field analyzer 704, the example sensor interface 706, the example database 707, the example transmitter/receiver 708, the example rule analyzer 709, the example measuring coil interface 712 and/or, more generally, the example analyzer 216, 416 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example analyzer 216, 416, the example tracker 702, the example magnetic field analyzer 704, the example sensor interface 706, the example database 707, the example transmitter/receiver 708, the example rule analyzer 709, and/or the example measuring coil interface 712 is/are hereby expressly defined to include a tangible computer readable storage device or storage disk such as a memory, a digital versatile disk (DVD), a compact disk (CD), a Blu-ray disk, etc. storing the software and/or firmware. Further still, the example analyzer 216, 416 of FIG. 7 may include one or more elements, processes and/or devices in addition to, or instead of, those illustrated in FIG. 7, and/or may include more than one of any or all of the illustrated elements, processes and devices.

Figure 8:
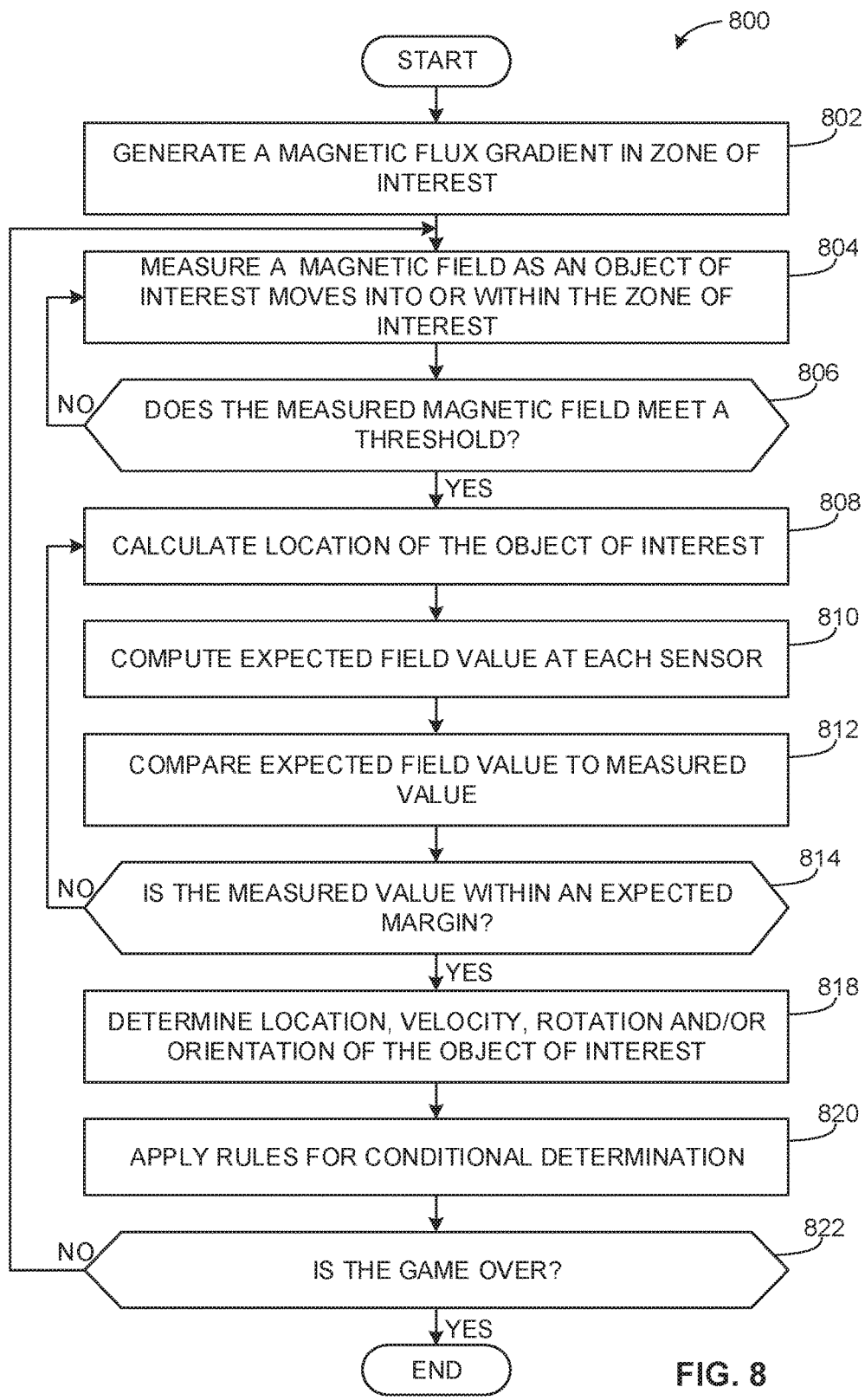
FIG. 8 is a flowchart representative of example machine readable instructions which may be executed to implement the example analyzer of FIG. 7.
Figure 9:
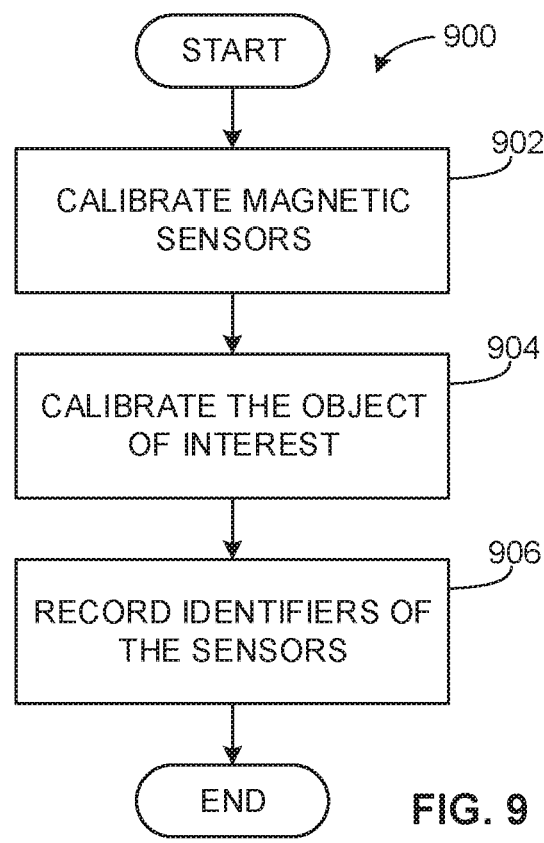
FIG. 9 is a flowchart representative of machine readable instructions which may be executed to calibrate the example analyzer of FIG. 7.

Flowcharts representative of example machine readable instructions, which may be implemented by the example analyzer 216, 416 of FIG. 7 is shown in FIGS. 8 and 9. In this example, the machine readable instructions comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 8 and 9, many other methods of implementing the example sport implement tracking system 700 may alternatively be used. For example, the order of execution of the blocks may be changed, and/or some of the blocks described may be changed, eliminated, or combined.

As mentioned above, the example processes of FIGS. 8 and 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8 and 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example program 800 of FIG. 8 begins as an object of interest such as a sport implement (e.g., the puck 204, the puck 600, the puck 640, the puck 650) is in use during a game, for example, and a determination is to be made as to whether the puck has entered a zone of interest (e.g., the zone of interest 217, the zone of interest 410), which is defined by a goal area in this example.

A magnetic field along with its corresponding magnetic flux gradient is generated in the zone of interest (block 802). According to the illustrated example, multiple coils such as the coils 402 are used to generate the magnetic field with a relatively high magnetic flux gradient. Alternatively, in some examples, a single coil is used instead to generate the magnetic field.

Next, the magnetic field is measured at the measuring coil interface 712 and/or the sensor interface 706 as the object of interest moves into or within the zone of interest (block 804). Additionally or alternatively, magnetic field peaks are measured and/or timed (e.g., a time history magnetic field peaks). In this example, the magnetic field is measured at a coil (e.g., the coil 300) of the goal area that is communicatively coupled to the measuring coil interface 712. Alternatively, the magnetic field is measured at multiple coils (e.g., the coils 402, the coil 322, the coil 324, the coil 332, the coil 334, the coils 342a, 324b, 342c, the coil 344) of the goal area. However, in other examples, the magnetic field is measured at a coil of the object of interest, such as described with the example puck 600 of FIG. 6. In some examples, the magnetic field is measured at a rate exceeding 1000 hertz (Hz).

The magnetic field analyzer 704 of the illustrated example then determines whether the measured magnetic field exceeds a threshold (block 806). According to the illustrated example, if the example magnetic field analyzer determines that measured magnetic gradient exceeds the threshold (block 806), control returns to block 804. Otherwise, control proceeds to block 808.

The magnetic field analyzer 704 calculates a location of the object of interest (block 808). In particular, the example magnetic field analyzer 704 utilizes magnetic field strengths, magnetic field peak timings and/or magnetic field measurements from multiple sensors (e.g., multiple coils) to calculate and/or estimate the position. Additionally or alternatively, the magnetic field analyzer 704 determines, a speed, a velocity, an orientation, a rotation and/or spin of the object of interest.

In some examples, the magnetic field analyzer 704 calculates an expected field value is (block 810). For example, the magnetic field analyzer 704 predicts expected magnetic field signal values associated with respective sensors based on the calculated location.

Next, the magnetic field analyzer 704 compares an expected field value to the measured magnetic field value (block 812).

The magnetic field analyzer 704 then determines whether the measured value is within an expected margin (e.g., an expected error margin) relative to an expected value (block 814). In particular, this determination/comparison is used to evaluate the calculated position and/or further refine the calculation in some examples (e.g., via a recursive least square solver). If the measured value is not within the margin (block 814), control returns to block 808. Otherwise, control of error proceeds to block 818.

In this example, after a measured value corresponding to the calculated location is within the error margin (e.g., no more further solving of the location of the object of interest is needed), the magnetic field analyzer 704 calculates at least one of the location (e.g., an updated location), a velocity, a rotation and/or an orientation of the object of interest (block 818).

In some examples, the rule analyzer 709 applies rules for a conditional determination (block 820). For example, the rule analyzer 709 utilizes locational data and/or time-based locational history data from the magnetic field analyzer 704 to apply rules (e.g., sport specific rules) to determine whether a condition is met. In one example, a rule that is analyzed by the rule analyzer 709 is whether an entire length of the object of interest is within the zone of interest. As a result, the output 716 may be triggered.

According to the illustrated example of FIG. 8, the rule analyzer 709 determines whether a game has ended and/or a power condition has occurred (e.g., power has been turned off) (block 822). If the game has not ended (block 822), control returns to block 804. Otherwise, the process ends.

The example program 900 of FIG. 9 may be executed to calibrate the example analyzer 216, 416 of FIG. 7 and/or an object of interest. In this example, magnetic sensors, which may include multiple coil sensors (e.g., the coils 402, the coil 322, the coil 324, the coil 332, the coil 334, the coil 342, the coil 344) and an object of interest (e.g., the puck 204, the puck 600, the puck 640, the puck 650) are to be calibrated to ensure highly accurate position measurements of the object of interest.

At block 902, the magnetic field analyzer 704 calibrates magnetic sensors (block 902). In particular, position offsets of the sensors relative to a reference frame are accounted for by placing a magnetic field source in a known position relative to the magnetic sensors. In such examples, each of the coils 402 are measured and/or analyzed by the magnetic field analyzer 704 for magnetic field variations based on their relative positions along the goal frame 401. In some examples, background magnetic fields (e.g., from the Earth) are also accounted for. Additionally or alternatively, noise from equipment and/or wiring are also taken into account. In this example, the calibration data of the multiple magnetic sensors are stored in the example database 707 of FIG. 7.

Next, the object of interest is calibrated (block 904). For example, a misalignment of a dipole from a center axis of the object of interest may be accounted for (e.g., the coil 604 of the puck 600 being misaligned) by measuring and/or characterizing an overall shape of the object of interest and determining where its corresponding magnetic field and/or dipole are located relative to its overall shape. Additionally or alternatively, aberrations in the shape of the object of interest are also taken into account (e.g., a slight shape irregularity of the puck 600). In this example, calibration data related to the object of interest is also stored in the database 707 for later offset calculations. In some examples, a sensor (e.g., a magnetic sensor embedded in the object of interest) can be calibrated to account for an initial operating condition (e.g., temperature, field conditions, etc.).

In some examples, identifiers and/or associated data (e.g., field strength, etc.) of each magnetic field sensor is stored in the database 707 by the magnetic coil interface 712 (block 906). When everything is calibrated, the process ends.

Figure 10:
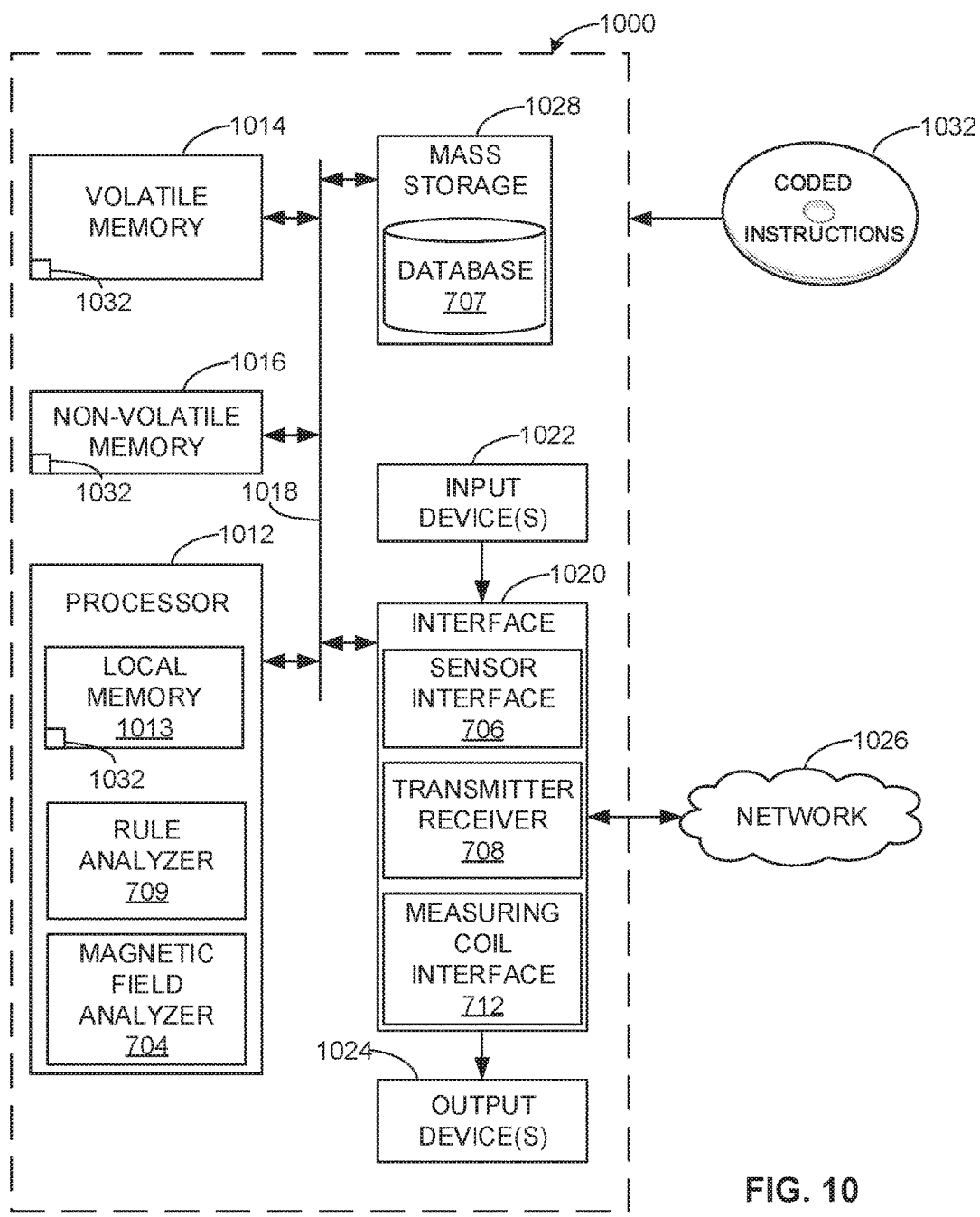
FIG. 10 is a processor platform that may be used to execute the example instructions of FIGS. 8 and/or 9 to implement the example analyzer of FIG. 7.

FIG. 10 is a block diagram of an example processor platform 1000 capable of executing the instructions of FIGS. 8 and 9 to implement the analyzer 216, 416 of FIG. 7 The processor platform 1000 can be, for example, a server, a personal computer, a mobile device (e.g., a cell phone, a smart phone, a tablet such as an iPad™), or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example implements the example magnetic field analyzer 704 and the example rule analyzer 709. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface. The interface circuit 1020 of the example implements the sensor interface 706 and the measuring coil interface 712.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.). In this example, the transmitter/receiver 708 is implemented by the interface circuit 1020.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives. In this example, mass storage devices 1028 are implemented by the database 707.

The coded instructions 1032 of FIGS. 8 and 9 may be stored in the mass storage device 1028, in the volatile memory 1014, in the non-volatile memory 1016, and/or on a removable tangible computer readable storage medium such as a CD or DVD.

From the foregoing, it will be appreciated that methods, apparatus and articles of manufacture have been disclosed which enable a cost-effective implementation of highly accurate (e.g., within millimeters) and quick location tracking systems/devices.

An example sporting goal includes at least two coils arranged along a zone of interest to generate a magnetic field, a sensor to measure a change in the magnetic field as a sport implement moves within or into the zone of interest, and a processor to determine a position of the sport implement based on the measured change in the magnetic field.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples shown herein are related to sports (e.g., hockey, football, soccer, etc.), the examples disclosed herein may be applied to any application in which a location, speed, orientation and/or spin are to be determined in a very quick manner (e.g., industrial or commercial locational tracking, auto-racing or drone racing finish lines, etc.).

What is claimed is:

1. An apparatus comprising:
   a first coil arranged in a first loop that defines a first portion of an opening of a sporting goal;
   a second coil arranged in a second loop that defines a base of the sporting goal, at least a portion of the second coil defining a second portion of the opening of the sporting goal, the first coil and the second coil to be energized simultaneously to generate a magnetic field;
   at least one sensor to measure a change in the magnetic field associated with the first and second coils as a sport implement moves within or into the opening of the sporting goal; and
   a processor to determine a position of the sport implement based on the measured change of the magnetic field.

2. The apparatus as defined in claim 1, wherein the processor is to determine at least one of a velocity, an acceleration, an orientation, a spin velocity, or a projectile path of the sport implement.

3. The apparatus as defined in claim 1, wherein the processor is to determine whether a trailing edge of the sport implement has entered the opening.

4. The apparatus as defined in claim 1, wherein at least one of the first or second coils includes an arcuate curve.

5. The apparatus as defined in claim 1, further including a third coil that mirrors a path of the first coil, the third coil offset from the first coil.

6. The apparatus as defined in claim 5, wherein the third coil is applied with current in a first phase, the first coil is applied with current in a second phase different from the first phase.

7. The apparatus as defined in claim 1, wherein the at least one sensor is disposed in the sport implement.

8. The apparatus as defined in claim 1, wherein the sport implement includes a passive coil to define a magnetic dipole field.

9. The apparatus as defined in claim 8, wherein the sport implement includes a plurality of passive coils that are oriented perpendicular to one another.

10. The apparatus as defined in claim 1, wherein the first loop includes multiple discrete coil loop circuits arranged along the opening of the sporting goal.

11. A method comprising:
    simultaneously energizing first and second coils to generate a magnetic field, the first and second coils arranged along a zone of interest of a sporting goal, the first coil arranged in a first loop that defines a first portion of the zone of interest of the sporting goal, the second coil arranged in a second loop that defines (1) a base of the sporting goal and (2) a second portion of the zone of interest of the sporting goal;
    determining a change of the magnetic field associated with the first and second coils as a sport implement moves into or within the zone of interest; and
    calculating, by executing instructions with at least one processor, a position of the sport implement based on the determined change of the magnetic field.

12. The method as defined in claim 11, further including determining at least one of a velocity, an acceleration, an orientation, a spin, or a projectile path of the sport implement.

13. The method as defined in claim 11, further including determining whether a trailing edge of the sport implement has entered the zone of interest.

14. The method as defined in claim 11, wherein the calculating of the position is based on measuring multiple peaks measured in the magnetic field.

15. A sporting goal comprising:

first and second coils located along a zone of interest of the sporting goal, the first coil arranged in a first loop that defines a first portion of a zone of interest of the sporting goal, the second coil arranged in a second loop that defines a base of the sporting goal and a second portion of the zone of interest of the sporting goal, the first and second coils to be energized simultaneously to generate a magnetic field;

at least one sensor to measure a change in the magnetic field as a sport implement moves within or into the zone of interest; and a processor to determine a position of the sport implement based on the measured change in the magnetic field.

16. The sporting goal as defined in claim 15, wherein the sport implement is a puck or a ball.

17. The sporting goal as defined in claim 15, further including a third coil mirroring a path of the first loop of the first coil, the third coil offset from the first coil.

18. The sporting goal as defined in claim 17, wherein the first and third coils define the first portion of the zone of interest of the sporting goal.

19. The apparatus as defined in claim 5, wherein the third coil is applied with current in an opposite direction from that of the first coil to define a localized magnetic field between the first coil and the third coil.

20. The apparatus as defined in claim 8, wherein the magnetic dipole field is orthogonal to a plane that encompasses the second loop.

21. The apparatus as defined in claim 1, wherein the first loop is in first plane, and the second loop is in a second plane orthogonal to the first plane.

22. The apparatus as defined in claim 1, wherein the first loop is associated with uprights and an upper horizontal bar of the sporting goal, and the second loop is associated with a lower edge of a goal opening of the sporting goal.

23. The apparatus as defined in claim 1, wherein the second coil defines an entire periphery of the base of the sporting goal.

* * * * *